United States Patent [19]

Schneider et al.

[11] Patent Number: 5,038,616
[45] Date of Patent: Aug. 13, 1991

[54] NON-INTRUSIVE DETERMINATION OF TIME VARYING AND STEADY STATE TORSIONAL LOAD MAGNITUDES AND LOCATIONS OF A SHAFT OR SYSTEM OF SHAFTS

[75] Inventors: Stanley Schneider, Palos Verdes Peninsula; Richard Spitzer, Berkeley, both of Calif.

[73] Assignee: S & S Technologies, Berkeley, Calif.

[21] Appl. No.: 431,409

[22] Filed: Nov. 2, 1989

[51] Int. Cl.$^5$ .................... G01N 29/04; G01H 1/10
[52] U.S. Cl. .................... 73/660; 73/650; 73/862.34; 364/508
[58] Field of Search .......... 73/650, 658, 660, 862.33, 73/862.34; 364/508

[56] References Cited

U.S. PATENT DOCUMENTS

| | | | |
|---|---|---|---|
| 2,879,470 | 3/1959 | Wright, Jr. | 73/660 |
| 3,058,339 | 10/1962 | Shapiro | 73/660 |
| 3,292,425 | 12/1966 | Conn | 73/660 |
| 4,134,303 | 1/1979 | Davis | 73/660 |
| 4,282,756 | 8/1981 | Molnar et al. | 73/650 |
| 4,294,120 | 10/1981 | Shima et al. | 73/650 |
| 4,317,371 | 3/1982 | Wolfinger | 73/660 |
| 4,337,647 | 7/1982 | Radcliffe et al. | 73/660 |
| 4,380,172 | 4/1983 | Iman et al. | 73/660 |
| 4,525,068 | 6/1985 | Mannaua et al. | 73/862.34 |
| 4,591,784 | 5/1986 | Kolitsch et al. | 73/660 |
| 4,793,186 | 12/1988 | Hurley | 73/660 |
| 4,977,516 | 12/1990 | Sheperd | 73/660 |

FOREIGN PATENT DOCUMENTS

| | | | |
|---|---|---|---|
| 22925 | 2/1983 | Japan | 73/650 |
| 22926 | 2/1983 | Japan | 73/650 |
| 2093992 | 9/1982 | United Kingdom | 73/862.33 |

*Primary Examiner*—Hezron E. Williams
*Assistant Examiner*—Craig Miller
*Attorney, Agent, or Firm*—Townsend & Townsend

[57] ABSTRACT

A nonintrusive method for determining the magnitudes and spatial and temporal origins of individual dynamic (time varying) torsion loads acting in superposition on a rotating shaft or system of shafts includes combining the measurements of said shaft's inertial response to the dynamic torsion loads with the measurements of discrete relative angular displacement parameters at causally connected space-time points. Changes in the shaft's characteristics, such as those due to change in its temperature or degradation of its structural integrity, can be monitored to provide updated torque determinations that maintain accuracy by taking these changes into account and to provide information on the onset and location of shaft fractures. Apparatus based on the method of this invention is self calibrating.

8 Claims, 10 Drawing Sheets

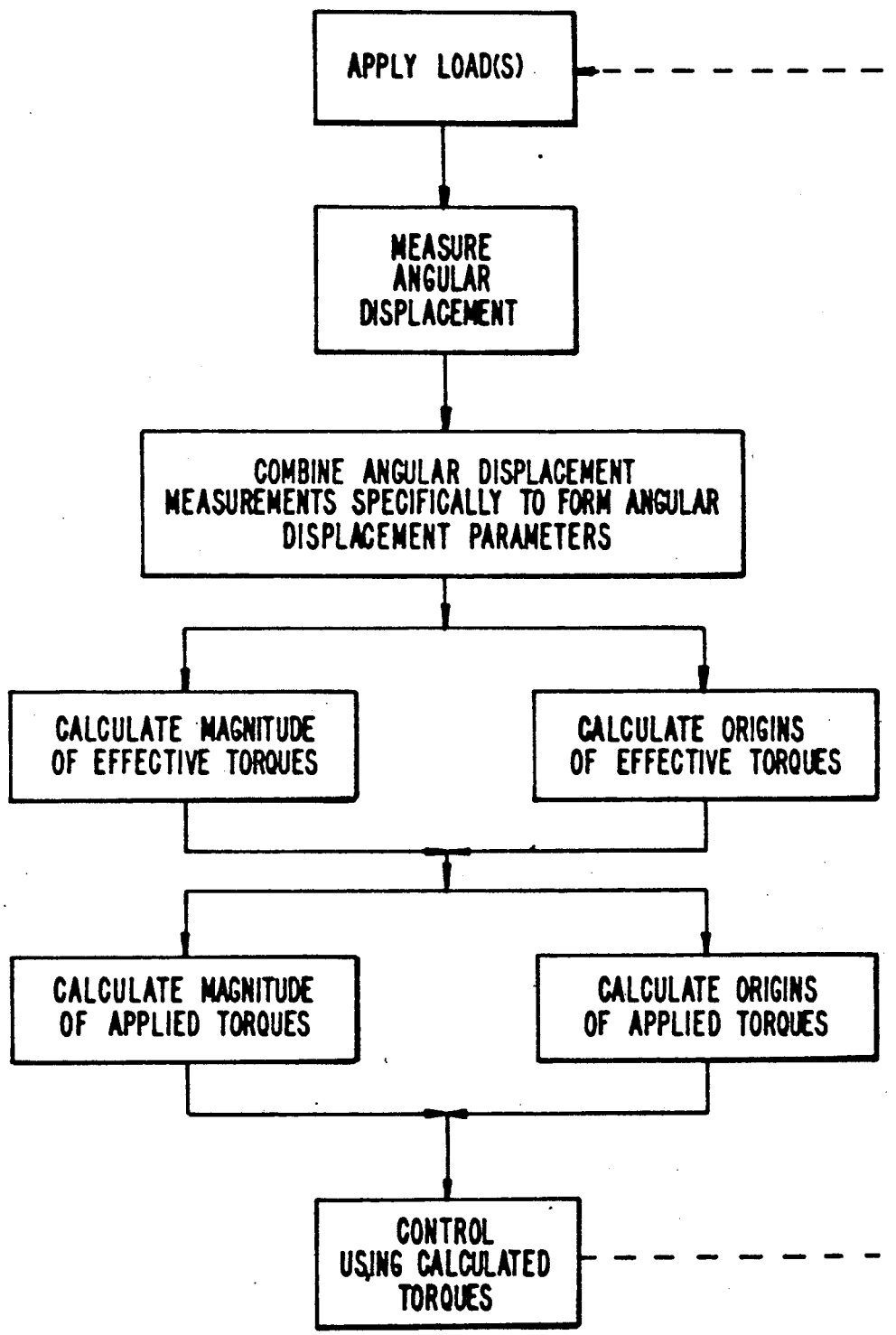
FIG._1.

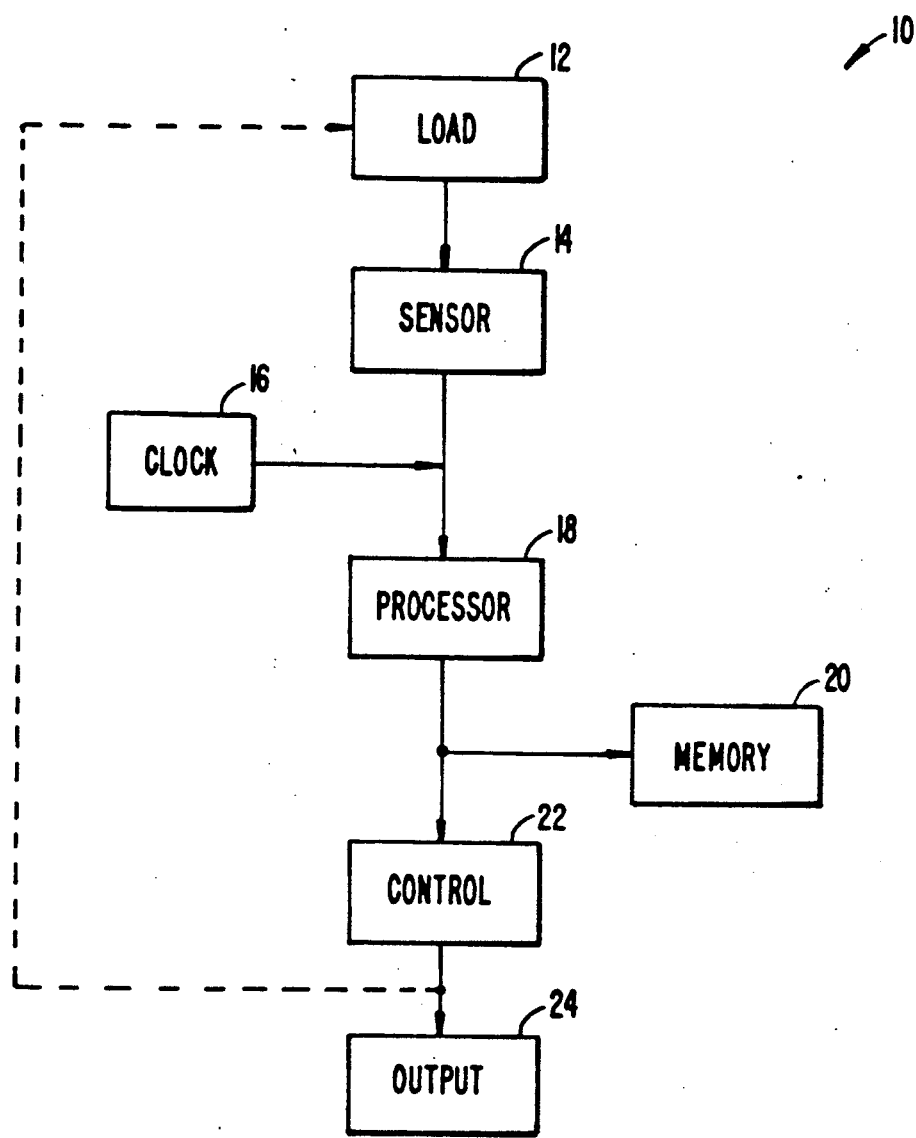
FIG._2.

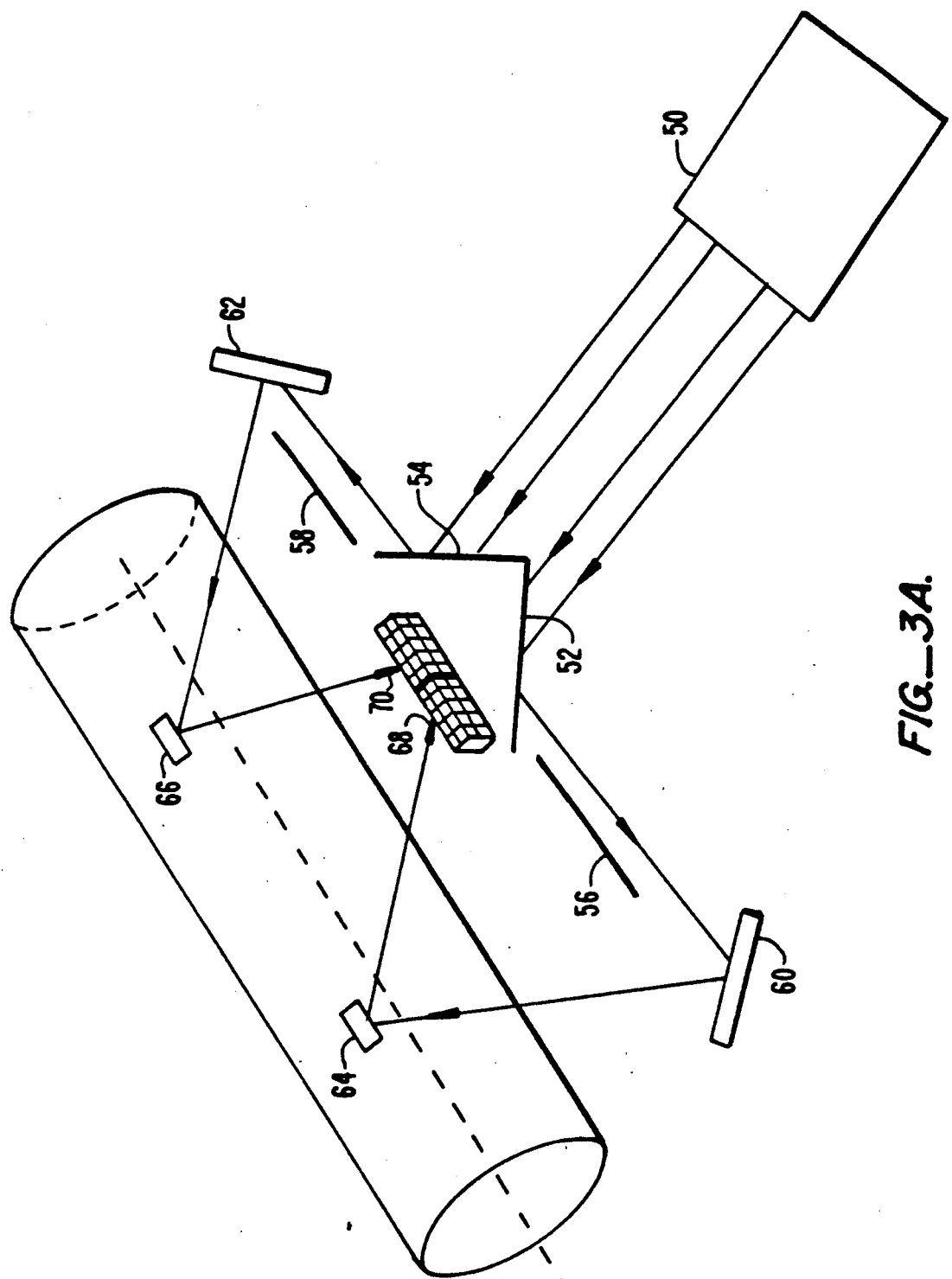
FIG._3A.

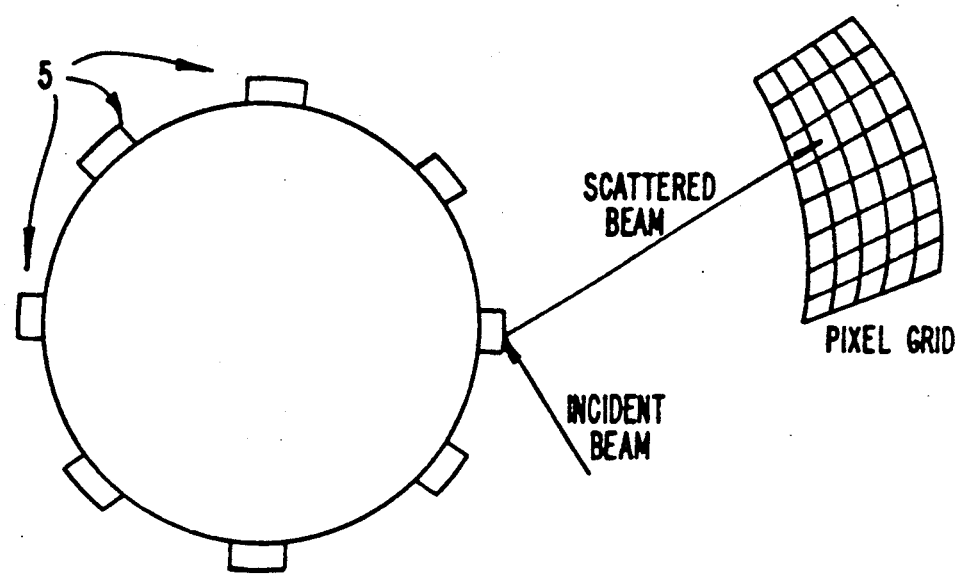
FIG._3B.
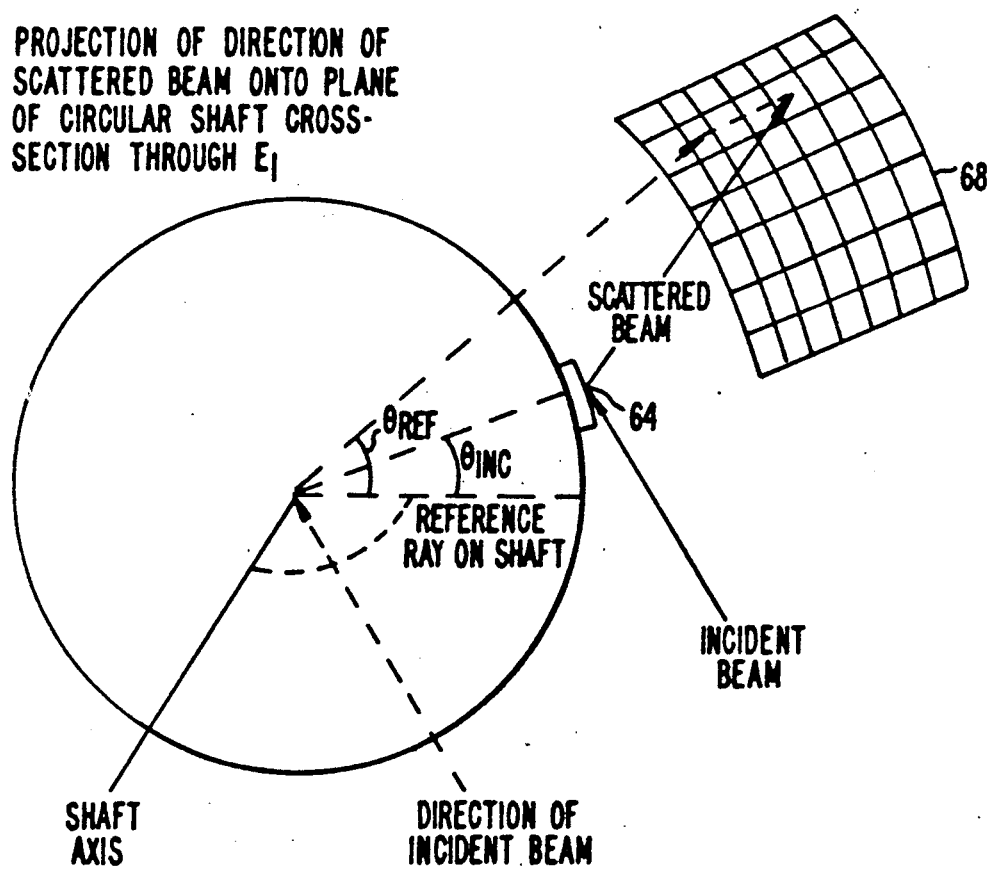
FIG._3C.

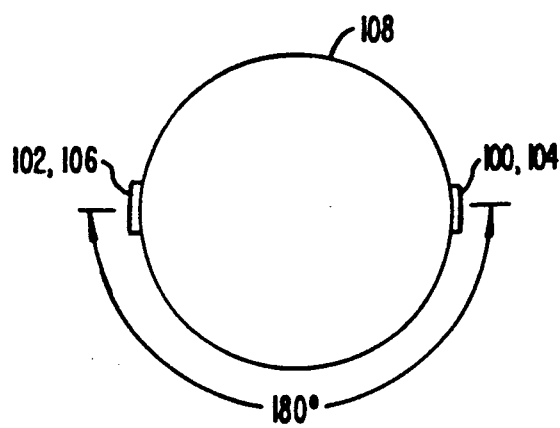
FIG._4A.
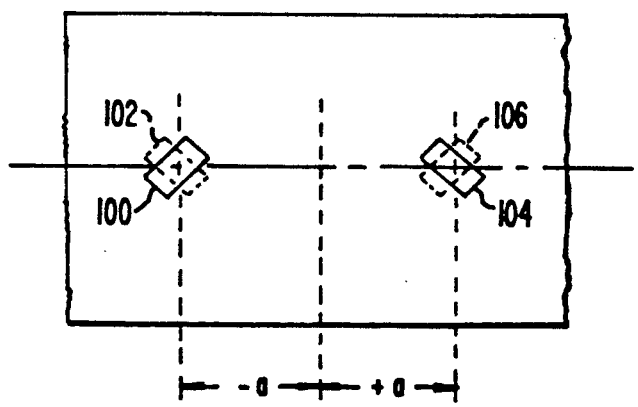
FIG._4B.
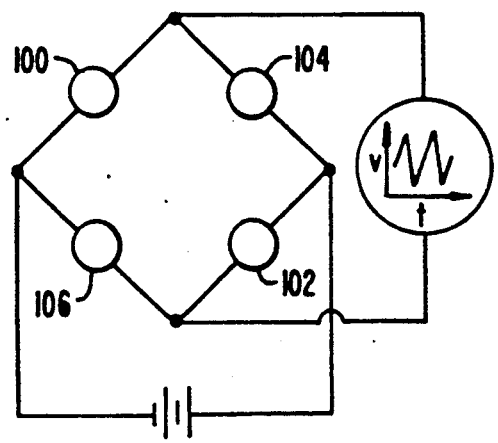
FIG._4C.

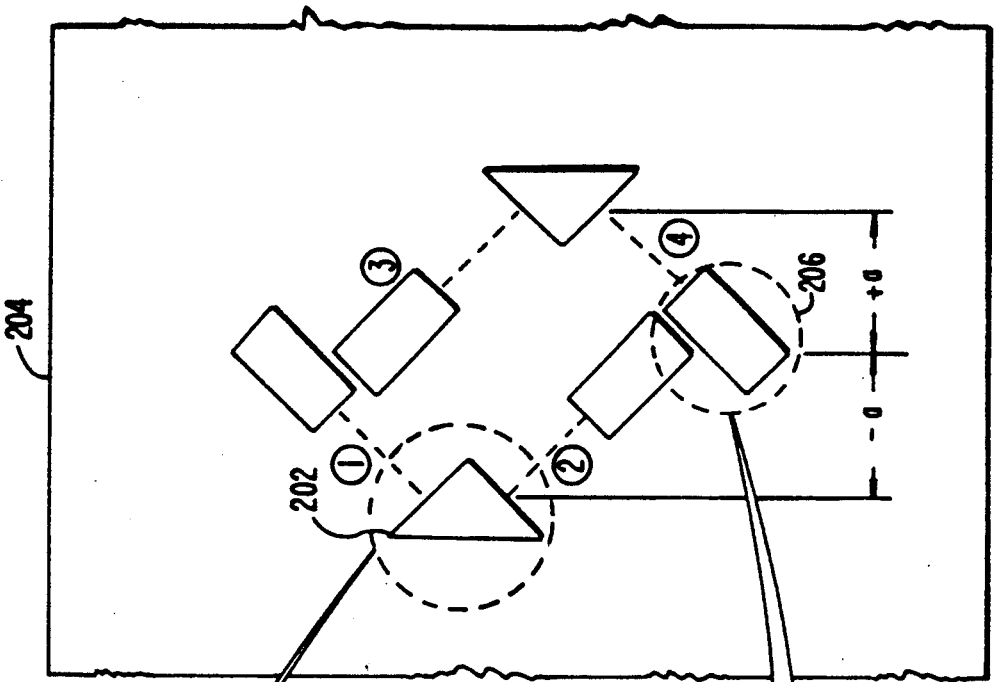
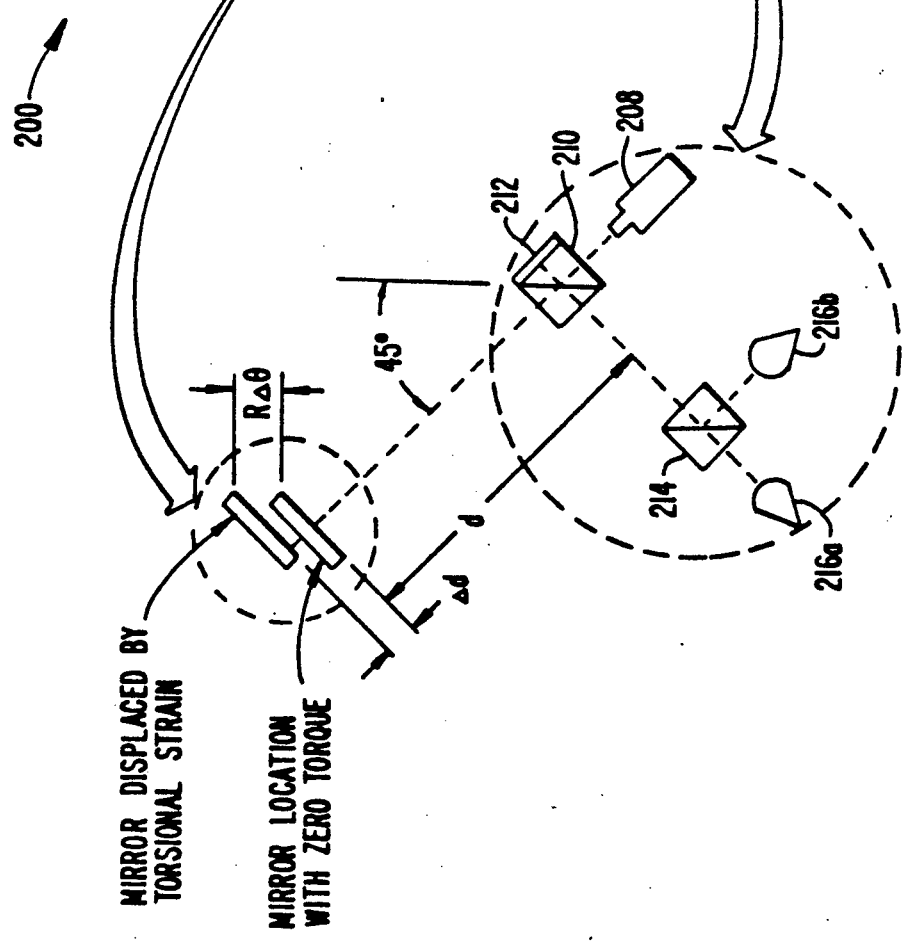
FIG._5.

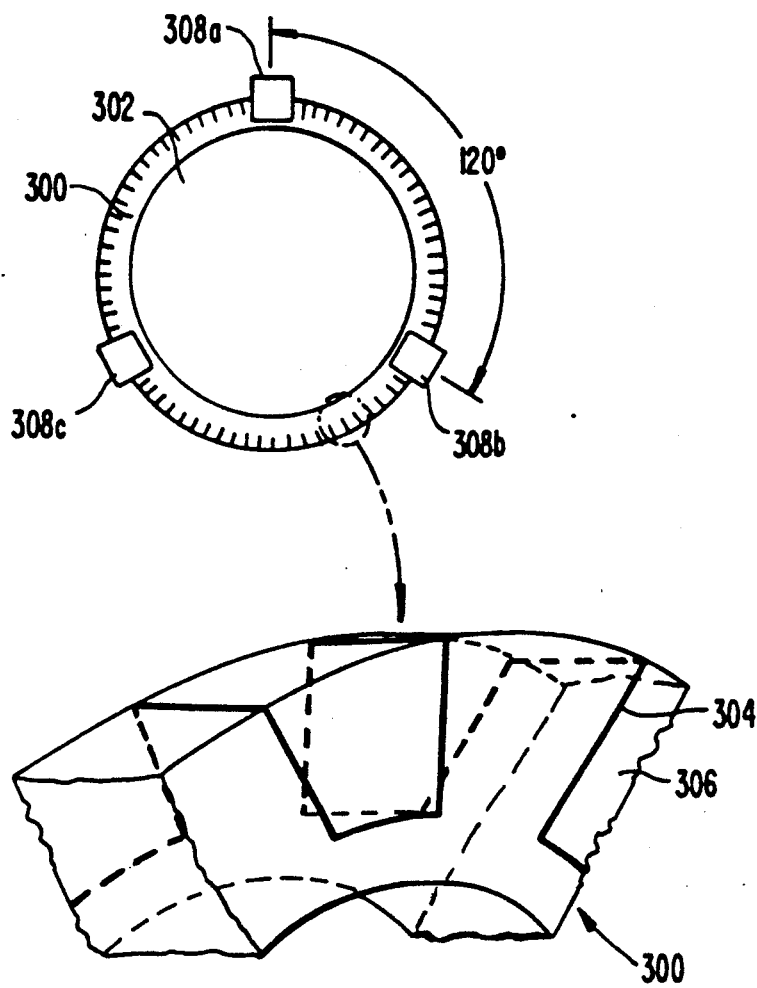
FIG._6A.
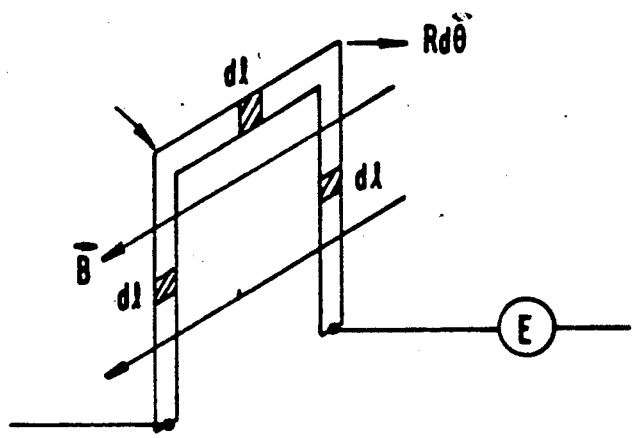
FIG._6B.

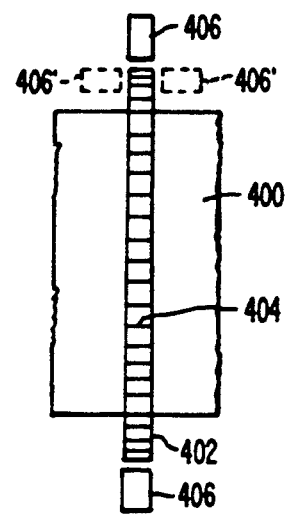
FIG._7A.
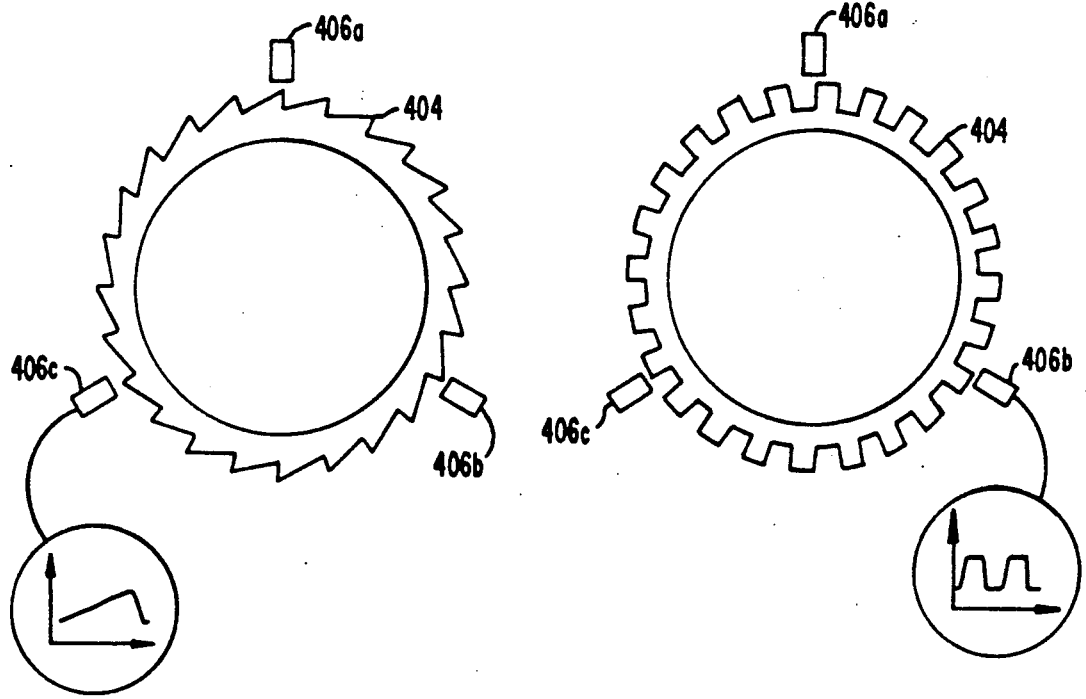
FIG._7B.   FIG._7C.

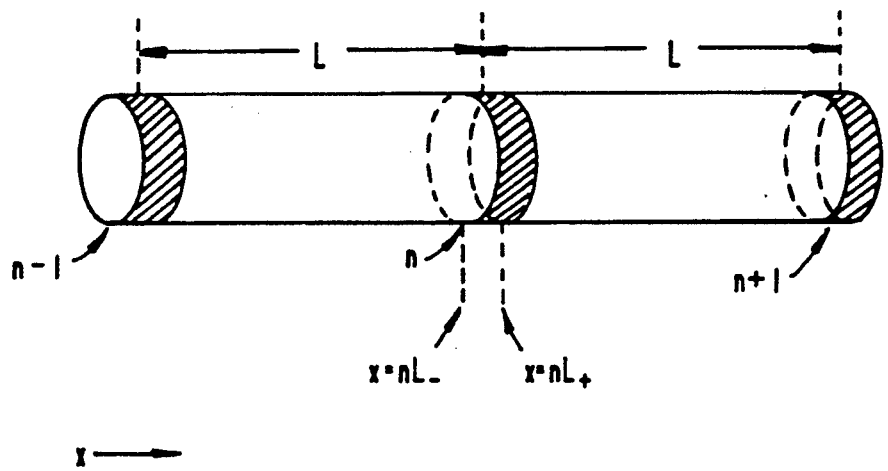
FIG._8.
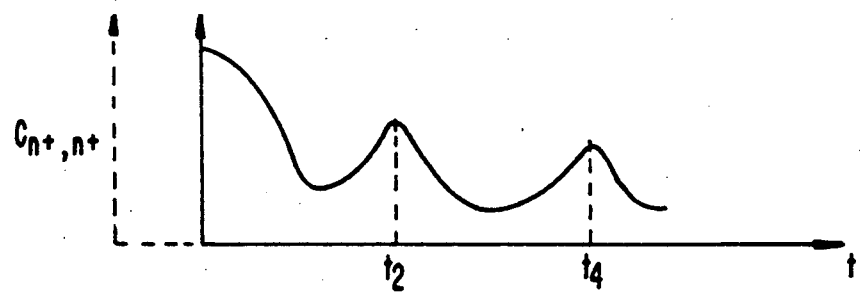
FIG._9B.
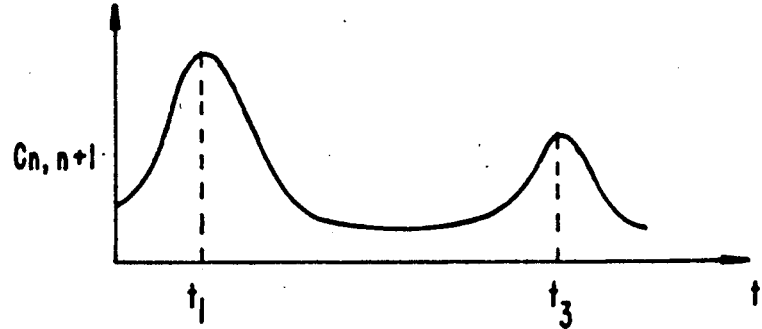
FIG._9A.

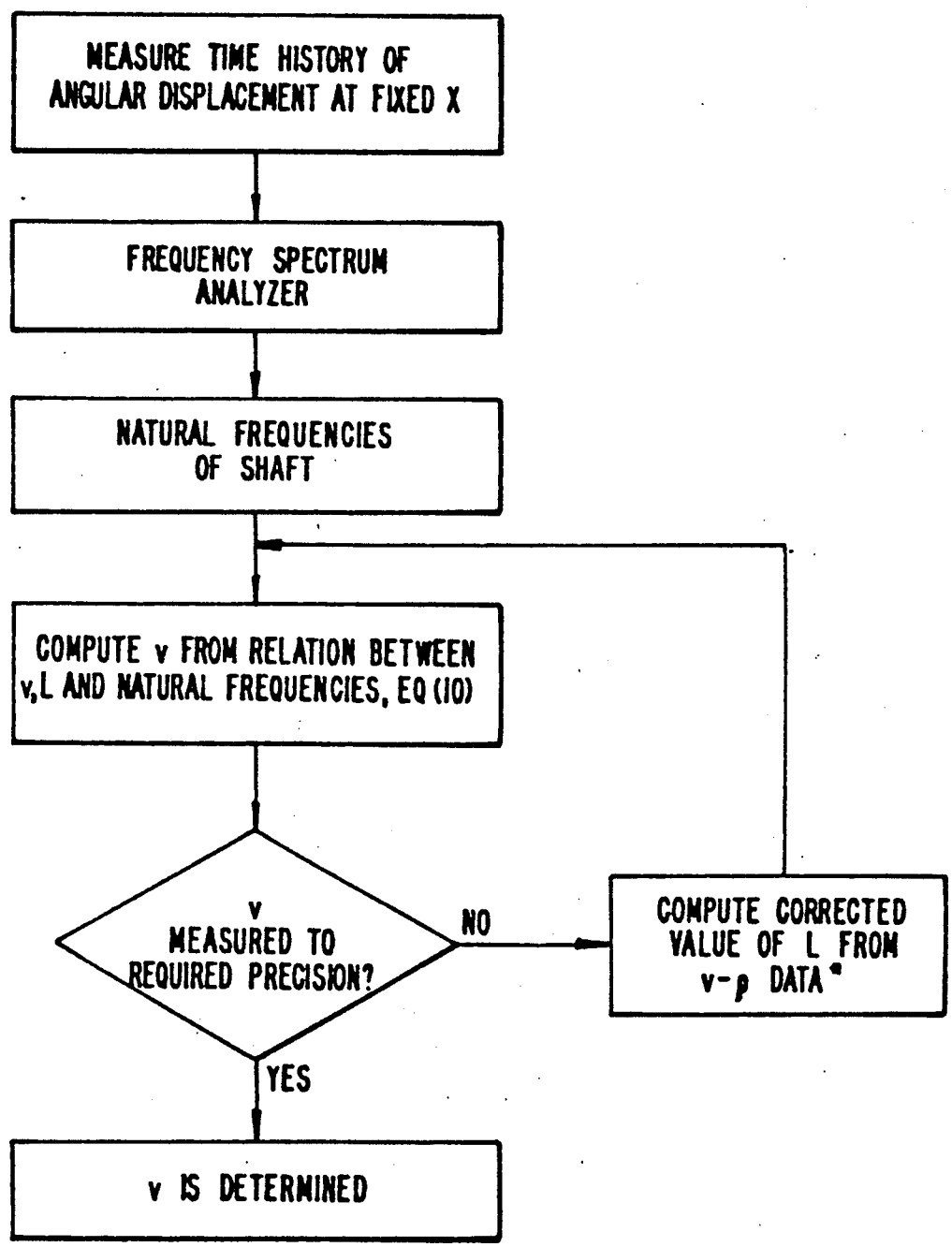
FIG._10.

NON-INTRUSIVE DETERMINATION OF TIME VARYING AND STEADY STATE TORSIONAL LOAD MAGNITUDES AND LOCATIONS OF A SHAFT OR SYSTEM OF SHAFTS

BACKGROUND OF THE INVENTION

1. Field of the Invention

The present invention relates generally to the field of rotating shafts, and more particularly to a method of and apparatus for determining the origins and magnitudes of dynamic torsion loads nonintrusively from measurements of specifically combined discrete counterparts of twist and angular velocity, and determination of related parameters from various known and applied conditions related thereto.

2. Description of the Background Art

Under steady state (time-independent) conditions, there is a net balance between the torque components applied to a shaft. For example, a time-independent torque applied to a shaft of a marine propulsion system by an engine is exactly balanced under steady state conditions by a time-independent torque of equal magnitude and opposite sign from the drag of a ship's propeller. In practice, time-independent torques are seldom truly realized for power systems with natural periods, such as those due to cylinders or propellers. Experimental results have shown that angular velocity of such a propulsion system fluctuates about some average. The frequency spectrum of the angular velocity contains peaks due to the periodicity of the torque developed by the engine driving system or the torque of the output load, e.g., a propeller in air or water, as well as due to the natural frequencies of the shaft.

The relation between a time-independent torque $T(x)$ applied at a point x along the axis of a shaft and the shear strain $\phi(x)$ produced on the surface of the shaft at that point is given by equation (1).

$$T(x) = (\pi/2)(G)\phi(x)(R^4 - r^4)/R \quad (1)$$

where G is the shear (Lame) modulus, and R and r are the outer and inner radii of the circular shaft, respectively. The shear strain is related to the angular displacement $\theta(x,t)$ on the surface of the shaft by equation (2).

$$\phi(x,t) = -R\partial\theta(x,t)/\partial x \quad (2)$$

The quantity equation (3) is the differential twist.

$$\theta_x(x,t) = \partial\theta/\partial x \quad (3)$$

Conventionally, steady state torques have been determined by measuring shear strain, for example, by a strain gauge. Under steady state conditions, a measurement of $\phi$ or, equivalently, of $\theta_x$ is by itself sufficient to determine the torque through relations (1) and (2). This method of determining steady state torque by measuring the twist or the shear strain and relating it to the torque by equation (1) is well known to those of ordinary skill in the art. Steady state torque is the only torque that can be determined by existing torque meters.

Existing torque meters are based on the measurement of twist and relating torque to that measurement through equations (1) and (2). The torque is thus assumed to be directly proportional to twist or shear strain. This assumption of proportionality, though valid for steady state torques, is incorrect when the load torque and engine torque are varying and unequal (time varying torques, or dynamic conditions). Although equation (2) for shear strain in terms of twist remains valid under dynamic conditions, the relation between torque and twist given by equation (1) does not. For unequal load and engine torques, the single measurement of twist represents a combination of the multiple torques; it cannot in principle determine either one of them individually, differentiate one from another nor determine which one is changing. Existing torque meters are inherently inaccurate to the extent that equilibrium is violated because their operation is based on the equation that is invalid for time dependent torques. The fact that equation (1) is derived from statics (T(x) is independent of both time and the shaft mass) limits the validity of any instrumentation system based on this equation to equilibrium (time independent) conditions.

In practice, existing torque meters are often used under dynamic conditions; such use is in error because the assumption of equilibrium underlying such meters is invalid. The result is that they are sensitive to a weighted average of the applied dynamic torques that cause accelerations. For sufficiently slow changes in torque, the error associated with applying existing torque meters to dynamic torques may be small and the measurement adequate for some applications. However, the size of the error cannot be determined by such time independent techniques. Furthermore, this error cannot be eliminated by calibration of the engine system under a given set of operating conditions because the weighting factors themselves depend on dynamic conditions and cannot be determined during normal operation by existing systems. Thus, measurement accuracy under dynamic conditions cannot be determined. Prior art torque meters are further incapable of determining the time required for a response (e.g., to a changing applied torque) to propagate along the system. The velocity of propagation of the response, called the torsional wave velocity, may be utilized in a number of ways and is not presently employed in the prior art.

Additionally, existing torque meters use values of the shear modulus calibrated prior to the assembly of the power system, normally at room temperature. Under actual operation conditions, the bulk parameters of the system (such as, for example, shaft moment of inertia, density of shaft material, shear modulus, speed of torsional waves, etc.) often change and/or are functions of position along the shaft. For example, changing and/or elevated temperatures are characteristic of advanced propulsion systems; the change in the value of the shear modulus over the operating temperature range of such systems is known to lead to an error of as much as 5-10% in the determination of torque, even at steady state, if this change is not taken into account. The temperature dependence of the shear modulus cannot generally be taken into account in existing torque meters. Variations in the shear modulus caused by varying temperatures, by position gradients, and by aging effects, such as fatigue, are not accounted for by existing systems. These systems cannot provide absolute calibration in the field. Significant sources of error are thereby introduced even for steady state conditions, where the method of existing torque meters is valid in principle.

Finally, torsional vibrations have, to date, been identified as sources of error which complicate computations of shaft characteristics. For some applications, the effect of torsional vibrations is to render measurement and calculation of shaft characteristics meaningless. Therefore, existing systems attempt to minimize the vibrations for the purposes of measurement and calculation. This represents an incomplete attempt to account for real-life effects, and measurements and calculations based on such methods are inherently inaccurate.

Hence, for significantly dynamic torques, for applications requiring high precision, for all applications requiring knowledge of the origin and magnitude of changing torques, existing torque meters cannot, in practice or even in principle, provide adequate data. The precision of existing torque meters is in fact limited by the operating principles on which they are based.

SUMMARY OF THE INVENTION

The present invention overcomes the shortcomings and disadvantages of prior art torque meters by providing a system which is capable of establishing magnitudes and origins of time varying torques in sufficiently short time to make these magnitudes and origins available for further use, such as control and damage avoidance. Measurements that are made on such short time scales as to be useful for further functions under operating conditions will be referred to hereinafter as real-time measurements. The present invention is applicable to determination of time independent (steady state) torques as well as to time-varying (dynamic) torques. Furthermore, the present invention is applicable to the determination of a number of significant parameters (e.g., reflection coefficients, torsional wave velocity, operating temperature) under various known and applied conditions. In turn, these parameters become available for the determination of torque. The present invention is applicable to all power systems that transmit torque through rotating elements.

The invention separates, in real time, a complex distribution of superposed torsion loads acting on a rotating element (e.g., a shaft) into its basic components of distinctive magnitudes and origins. The present invention accepts data on angular motion at specifically related locations and times along the surface of the rotating element, computes the torques that produce the motion, and determines the directions from which the torques originate. The angular motion data comprise values of $\theta(x,t)$ measured at specifically related times and positions along the shaft. Alternatively, these data comprise direct measurements of the twist, $\theta_x$, combined specifically with direct measurements of the angular velocity, $\theta_t$ given by equation (4).

$$\theta_t(x,t) = \partial\theta(x,t)/\partial t \qquad (4)$$

The present invention provides diagnostic information which is not otherwise available by current methods and/or systems, that information being capable of supporting sophisticated control and maintenance practices, making possible much more efficient and longer lived systems. Systems based on the present invention are self calibrating.

BRIEF DESCRIPTION OF THE DRAWINGS

FIG. 1 is a functional block diagram of the operation of the present invention;

FIG. 2 is a block diagram of an apparatus employing the present invention;

FIGS. 3A, 3B and 3C are detail drawings of an angular displacement measuring system according to a first embodiment of the present invention;

FIGS. 4A, 4B, and 4C are detail drawings of sensor hardware and circuitry according to another embodiment of the present invention;

FIG. 5 is a detail drawing of a Michelson-type spatial-separation measuring interferometer as employed in an embodiment of the present invention;

FIGS. 6A and 6B are detail drawings of a magnetic induction gauge arrangement as employed in another embodiment of the present invention;

FIGS. 7A, 7B, and 7C are detail drawings of two versions of eddy current proximity sensors as employed in yet another embodiment of the present invention;

FIG. 8 is a drawing of a coupled shaft system;

FIGS. 9A and 9B are graphical representations of correlation functions used, for example, to determine the onset of shaft failure; and FIG. 10 is a block diagram of an iterative process as employed in an embodiment of the present invention for determination of torsion wave velocity.

DETAILED DESCRIPTION OF THE PREFERRED EMBODIMENTS

FIG. 1 is a functional block diagram of the operation of the present invention. Essentially, the environment the present invention operates in includes a load applied to a shaft. The load may or may not result in actual rotation of the shaft, but will result in some angular displacement of the shaft. The angular displacement along the surface of the shaft will be measured by appropriate measuring means discussed in detail below. Furthermore, the angular displacements at specifically related space-time points will be combined specifically to form discrete counterparts of the differential twist and differential angular velocity. The magnitudes and origins of the applied net load will be calculated from specific combinations of discrete twist and discrete angular velocity. The information resulting from such calculations may then be used to control the application of further loads, detect failure, evaluate various shaft qualities, etc.

FIG. 2 shows an apparatus employing the present invention as described above with regard to FIG. 1. The apparatus 10 consists of a number of blocks performing various functions. A number of the functions performed by these blocks are the subject of more detailed description below. The apparatus consists of an applied load 12 which is coupled to a shaft (not shown). Sensors 14 determine angular displacement for two or more positions along the length of the shaft. Sensors 14 together with clock 16 may also measure twist and angular velocity at each of the points along the length of the shaft. Processor 18 then utilizes the measured angular displacement or, alternatively, the twist and angular velocity, to calculate magnitudes and origins of torque applied by load 12. This information may be stored in memory 20 and/or used to control other related systems by controller 22, such as outputting selected information by output 24 and/or post solution control of load 12.

There are two distinct aspects to the physical basis underlying the method of the present invention. They are:

(1) Dynamic torques cause angular acceleration of a rotating shaft. A portion of the dynamic torque acting on the angularly accelerating shaft must compensate for the shaft's rotational inertia. Therefore, the shaft's inertial response to the dynamic torques is measured.

(2) The effects of a torque are transmitted with finite velocity. The angular displacement $\theta(x,t)$ produced at a given space-time point on the surface of the shaft by a torque applied at another space-time point is due to torsional waves propagating from the point of application to that of displacement. The speed, v, of the torsional waves depends on the material properties of the shaft and on its temperature; values may be tabulated for materials based on physical data (e.g. tables of modulus of elasticity per temperature for particular materials, such as those distributed by the AMS and others). The torsional wave propagates from one space-time point $(x_1,t_1)$ on the shaft to another space-time point $(x_2,t_2)$, which is related to the first space-time point by the speed of the wave by the following expression.

$$x_2 = x_1 + v(t_2 - t_1) \qquad (5)$$

Two such space-time points related by equation (5) will hereinafter be said to be causally connected. Causally connected space-time points are specific to the particular torsional wave component that defines these points. Two space-time points that are causally connected for a particular torsional wave component will not in general be causally connected for other torsional wave components. Such point-by-point transmission of torsion waves will be referred to hereinafter as causal transmission of torque. The effects of a torsion load at any two space-time points on the shaft are thus specifically related to each other by the causal transmission of torsional waves. The present invention relies on causal transmission of torque to determine both magnitudes and origins of effective and applied torques.

1. Method of Calculation

The method of this invention for determining dynamic torques relies on the solution of the dynamic equation for the causal transmission of torque over a rotating shaft. The differential equation for the angular displacement $\theta(x,t)$ on the surface of a shaft subjected to torsional loads is the non-homogeneous torsional wave equation, that is, the wave equation with torsional load sources, equation (6);

$$\partial^2\theta(x,t)/\partial t^2 - v^2(x)\partial^2\theta(x,t)/\partial x^2 = \Sigma_j (\partial \mathcal{Q}_j (x,t)/\partial x)/I(x) \qquad (6)$$

where $v(x)$ is the torsional wave speed as a function of the position along the shaft, $I(x)$ is the shaft moment of inertia per unit length, and $\mathcal{Q}_j(x,t)$ is position and time dependent effective torque and where the components of the effective torque distributions (linear densities) acting on the shaft are given by $\partial \mathcal{Q}_j(x,t)/\partial x$.

The effective torques $\mathcal{Q}(x,t)$ comprise the applied torques $T(x,t)$, such as those from an engine or a propeller, as well as the reflections at the boundaries. The effective torques contain the entire time history of the applied torques, their propagation in both directions over the shaft, and their multiple reflections at both ends. The angular displacement at any spatial point and time is a measure of the effective torques and, hence, of the entire history of the applied torques. The applied torques can be obtained from specific combinations of effective torques at specifically related times, given knowledge of the reflection coefficients at the boundaries. The procedure for separating the applied torques from the effective torques is described further below, together with a method for calibrating the reflection coefficients.

When supplemented by appropriate initial and boundary conditions, equation (6) specifies the dynamics of torque transmission by torsional waves. Equation (6) neglects the damping of the rotational motion that always accompanies waves propagating in a real medium. The method taught by this invention is readily extendable to include this kind of internal friction by adding the term $\mu\dot\theta(x,t)$, where $\mu$ is the internal friction coefficient, to the left side of equation (6). But it is well known that the effects of this type of friction are very small in rotational systems and negligible for practically all engineering applications. This term is omitted solely for the purpose of simplicity and clarity of exposition; its omission is not intended to limit the scope of this invention.

The general solution of equation (6) is given by equation (7);

$$\theta(x,t) = \Sigma_j \int dx' dt' g(x,x';t-t')(\partial \mathcal{Q}_j(x',t')/\partial x')/I(x') \qquad (7)$$

where $g(x,x'; t-t')$ is the time retarded Green function for the wave equation with no reflections at either end (matched boundary conditions) and with the unit impulse source of equation (8) where $\delta$ is the Dirac function.

$$\partial^2 g/\partial t^2 - v^2(x)\partial^2 g/\partial x^2 \delta(x-x')\delta(t-t') \qquad (8)$$

Causal transmission of torsional waves is a consequence of the choice of retardation as part of the initial conditions. The three simplest types of boundary conditions correspond to: (1) both ends of the shaft being free, in which case the twist at the ends is zero; (2) both ends of the shaft being fixed, in which case $\theta$ is a constant at the end; or, (3) one end being free and the other end being fixed. More general boundary conditions correspond to a shaft coupled to a junction, such as a gear box, with reflection of the torsional waves at each junction, their transmission through the junction, and their absorption by the junction. Other methods for solving the wave equation include the method of characteristics and the method of Laplace transforms. Each of these procedures for solving the wave equation under prescribed boundary and initial conditions is well known in the art.

Expression (7) for $\theta(x,t)$ together with the associated spatial boundary conditions and temporal initial conditions specify completely the result of the effective torque loads (applied torques plus reflections) on the rotational behavior at any space-time point on the surface of the shaft. That is, it relates arbitrary unknown effective torque loads acting at specified space-time points on the shaft to the effect they collectively produce at any space-time point on the surface of the shaft. It thereby connects directly measurable quantities (the angular displacement parameters) to combinations of the individual dynamic effective torsion loads. In turn, combinations of the parameters, measured at space-time points prescribed by the propagation characteristics of the torsional waves between said points and the points at which the torsion loads are applied, provide the basis for determining any individual effective torsion load by separating the effects produced by said load from the effects produced by the remaining effective torsion loads. Angular measurements made at such specifically selected space-time points, and without absorption or reflection of torsional waves between these points, will be referred to hereinafter as causally selected measurements. The choices of angular measurements to be made for a given physical configuration, of the space-time points at which these measurements are made, and of the combinations of the resulting angular displacement parameters, follow from the solution of the torsional wave equation for the particular initial and boundary conditions that apply in this configuration and from the anticipated temporal characteristics of the torsion components to be determined.

The speed v of torsional waves enters as a parameter into the wave equations (6) and (8) and therefore in the solution, equation (7), for $\theta(x,t)$. The solution does not depend explicitly on the shear modulus G, in contrast to the prior art methods of equation (1). In general, the role played by the shear modulus in prior art methods is replaced in the method of the present invention by the speed of torsional waves, both for steady state and for dynamic torques. The relationship between these two elastic constants is given by equation (9);

$$G = v_\rho^2 \tag{9}$$

where $\rho$ is the density of the shaft material. The speed of propagation of torsional waves can be readily calibrated under controlled laboratory conditions (e.g., on a test bed) as a function of temperature or position along the shaft by those of ordinary skill in the art using time-of-flight techniques. Such time-of-flight techniques can also be applied under operating conditions, but they require imposing a known torque on the system and an additional set of sensors beyond those needed for the measurements used to determine the torques. Alternatively, the speed v can also be calibrated nonintrusively according to the method of this invention using only those sensors that are used for the torque determinations.

As noted above, the present method relies on measuring angular displacements at selected positions and times. The frequency transform (spectrum) of the time history of any angular quantity, e.g. $\theta(x,t)$ or $\theta_t(x,t)$, measured at any position along the shaft will contain peaks corresponding to the natural frequencies $\omega_n$ of the system. The peaks are sharp in the case of total reflection at the ends of the shaft, and they broaden in direct relation to the portion of the energy of the torsional waves that is lost due to either transmission through or absorption by the joints or by the shaft itself. The readout from a frequency-spectrum analyzer will give values of these frequencies directly. The speed of the torsional wave is related to the difference between consecutive frequencies by equation (10);

$$v = L(\omega_{n+1} - \omega_n)/\pi \tag{10}$$

where n is a positive integer. Equation (10) can be used to calibrate v under operating conditions. Because the temperature dependence of L for metals is much smaller than that of v and of the frequencies, it can be neglected for most applications; the temperature dependence of v is therefore given to a good approximation by that of $\omega_n$. Omission of details of the procedure that takes into account the temperature variation of L is not intended to be in any sense limiting. The value of v can therefore be determined under operating conditions by measuring the difference in the frequencies provided by the frequency transform of the time record of the selected angular quantity. The aforementioned difficulty, in current art, of calibrating the elastic properties of the shaft when it heats up during operation is thereby eliminated in the method of this invention.

In fact, v for the aforementioned applications can be calibrated under operating conditions from the spectral content of, e.g. $\theta_t$ at two different temperatures, even without knowledge of the value of L. Equation (11) relates the measured difference between the natural frequencies, $\omega_{n+1}^o$ and $\omega_n^o$ at a temperature at which the speed, $v_o$ is known to this measured difference at the unknown temperature at which the speed is to be determined $$(v/v_o) = (\omega_{n+1} - \omega_n)/(\omega_{n+1}^o - \omega_n^o) \tag{11}$$

The value of $v_o$ is known either directly from tables or, by equation (9), from known values of G and $\rho$ at that temperature.

Determination of v may be had in varying degrees of precision. One method for increasing the precision of such a determination is iterative calculation. A process for doing so is shown in FIG. 10. If the specified precision for determining v calls for iteration, then $\rho$-temperature and v-temperature data will be used to arrive at the desired result. Alternatively, v-$\rho$ tables may be prepared and used for the system. The iteration involves use of equation (10) to account for the weak dependence of L($\rho$) on temperature. If the specified precision does not require taking into account the weak dependence of L($\rho$) on temperature, then iteration is not needed, the value of L does not have to be known, and we can rely on equation (11), which requires using a known value, $v_o$, of velocity at known frequencies, $\omega_n^o$.

Equations (10) and (11) can be used to calibrate v nonintrusively under operating conditions if the frequency spectra of the applied torques contain sizeable components at some of the frequencies $\omega_n$. This may not be the case for slowly varying applied torques.

An alternative means to calibrate v is applicable even when the spectral content of the applied torques does not include sizeable components at any of the frequencies $\omega_n$, provided only that these torques have a discernable peak at some impressed frequency. This will in general be the case for power systems with natural periods, such as those due to electric motors, cylinders or propellers. This means of calibration relies on the frequency transform, $\bar{\theta}(x,\Omega)$, of the angular displacement evaluated at a given position x and impressed frequency $\Omega$. The general expression for $\bar{\theta}(x,\Omega)$ depends on the velocity v and other parameters of the system, such as the reflection coefficients at the ends of the shaft. Measurement of the ratio of the amplitudes of $\bar{\theta}(x,\Omega)$ at two different temperatures thus provides means to calibrate v at an unknown temperature in terms of its known value at a known temperature and the values of temperature-independent parameters. The leading approximation for this ratio, equation (12), is however independent of these additional parameters;

$$\theta(x,\Omega)_1/\theta(x,\Omega)_2 = v_1/v_2 \tag{12}$$

where the subscripts 1 and 2 refer to two different temperatures. Working expressions beyond the leading approximation can be derived from the general expression to provide higher precision, but they will in general differ for distinct applications because of the varying approximations called for by the wide ranges of values of the relevant parameter. Omission of the general expression for the ratio on the left side of Equation (12) is not intended to be limiting.

The measurement of v under operating conditions also provides means for measuring the temperature under operating conditions. This follows because either (i) data on the temperature dependence of v are already available in the temperature range of interest, (ii) such data for a particular temperature range can be readily obtained under laboratory conditions by those of ordinary skill in the art, or (iii) data on G and $\rho$ in the required temperature range can be combined with relation (9) and the measured value of v to determine the unknown temperature.

Instrumentation systems based on the non-intrusive method of this invention will thereby provide real-time absolute calibration of temperature and of torsional wave speed under temperature varying and position dependent operating conditions.

2. Sensor Arrangement

As noted above, one type of apparatus built according to the present invention will include one or more sensors (see FIG. 2) for determining local angular displacement. One implementation of sensors for measuring angular displacement is shown in FIGS. 3A and 3B. This implementation comprises measurement of the time histories of the angular displacements of two sets of fiducial points, the two sets having equal numbers of fiducial points, each set arranged on a circular circumference of the shaft with equal distances between neighboring elements of a set, and the two circumferences being separated by a known distance along the surface of the shaft. Corresponding pairs of fiducials, one fiducial from each set, have a common value of $\theta$ when the shaft is not twisted, that is, when no torques are applies to the shaft. This implementation has the capability of great precision and can therefore monitor small changes in torques. It involves a collimated source 50 of near infrared or visible light, for example, a laser or an incoherent source collimated by state of the art collimators, the source being of modest power and modestly low beam divergence; two fixed mirrors 52 and 54; two optically opaque walls 56 and 58; two fixed mirrors 60 and 62; two sets of mirror segments, one mirror segment attached to the shaft at each fiducial, with a corresponding pair of mirror segments 64 and 66, one segment from each set, being shown in FIG. 3A, and one complete set 5 being shown in FIG. 3B; two two-dimensional grids of photo-sensitive pixels 68 and 70, such as state of the art CCDs (charge-coupled devices), CIDs (charge-injection devices), or quad cells; a clock system (not shown); and a microprocessor (also not shown). The light source, fixed mirrors and opaque walls are all in one plane; the mirror segments are, in general, off-planar, as they are rotating with the shaft. The geometrical configuration of the fixed mirrors is chosen so that a single light source is split into two light beams, each beam being used to measure the time history of $\theta$ at one of two locations along the shaft. The two optically opaque walls are used to eliminate light background. The two grids of pixels are positioned adjacent to each other to minimize or even negate any differential temperature effects on the photo-sensors.

Collimated light from the source 50 strikes the mirrors 52 and 54, where it is divided into two reflected light beams; the two beams pass through a region shielded from background light by the optically opaque walls 56 and 58 and are reflected from the mirrors 60 and 62 onto the mirror segments 64 and 66 rotating with the shaft; the beams reflected from 64 and 66 are recorded by the pixel grids 68 and 70, respectively. The geometry of the fixed mirrors is such that the beam reflected from each of 60 and 62 spans an angular field of view of 360°/m, where m is the number of equally spaced mirror segments in each of the two sets, and with 360°/m between adjacent segments in a set. This configuration allows for continuous monitoring of the beams reflected from 60 and 62 on the circumference of the rotating shaft. For example, the configuration shown in FIG. 3B, with eight mirror segments per set, can accommodate an angle of incidence on a given segment in the range $-22.5° < \theta_{inc} < 22.5°$, with one of the mirror segments always in the field of view of the incident beam; $\theta_{inc}$ is the value of $\theta$ at the mirror segment 64, as measured from the reference ray on the shaft defined by the intersection of the circular cross section of the shaft through 64 with the plane containing the axis of the shaft and the direction of the incident beam. The reflected angle is then twice the incident angle, $\theta_{ref} = 2\theta_{inc}$, where $\theta_{ref}$ is the value of $\theta$ measured from the same reference ray as $\theta_{inc}$ up to the projection of the direction of the scattered beam onto the circular cross section of the shaft through the mirror segment 64; the angles $\theta_{inc}$ and $\theta_{ref}$ are shown in FIG. 3C. Each pixel grid is capable of recording a reflected beam with an angle of reflection within a range equal to twice the angular aperture of the incident beam; for the example of eight mirror segments per set, the angle of reflection from 64 and 66 is in the range $-45° < \theta_{ref} < 45°$. Because the mirror segments 64 and 66 span finite portions of the beams reflected from the mirrors 60 and 62, there is a distribution in the values of the beams reflected from 64 and 66, and hence in the $\theta$ values recorded by the pixel grids 68 and 70. The centroid of the distribution of $\theta$ values recorded on each pixel grid is calculated by the microprocessor and is used as input of the $\theta$ value in the torque-determination algorithm. The pattern on each pixel grid is recorded at time intervals monitored by a state of the art clock system. The difference in the centroid values of $\theta$ computed at a given pixel grid at two different times is a measure of the difference in the angular displacements at a given position along the shaft over the corresponding time span and hence, by equation (18) below, of the discrete angular velocity. The difference in the centroid values of $\theta$ computed for the two pixel grids at the same time is a measure of the difference in the angular displacements at two different positions along the shaft at the same time and hence, by equation (17) below, of the discrete twist. This implementation is readily capable of measuring values of $\theta$ to a precision within the range of 10 nanoradians, down to 100 microradians, using only state of the art components. It allows for the measurement of all quantities needed by the algorithm given below for the determination of the magnitudes and origins of the unknown torques, both effective and applied. Alternative implementations use state of the art apparatus to measure selected quantities needed to determine dynamic torques. Such alternative implementations generally require two instrument systems to measure all quantities needed to determine dynamic torques.

A second arrangement of sensors, employed to determine strain and hence twist $\theta_x$, is shown in FIGS. 4A through 4C. This implementation involves a plurality of strain gauges 100, 102, 104 and 106 positioned to measure the torsional strain of a circular shaft 108. Strain gauges 100, 102, 104, and 106 are arranged in pairs 180° opposite one another on the surface of shaft 108. Each gauge is arranged at an angle, preferably 45°, to the longitudinal axis of shaft 108. The gauge placement and orientation shown in FIGS. 4A and 4B, and their connection to the resistance sensing bridge circuit of FIG. 4C is chosen to eliminate the effects of axial or radial strain resulting from imposed loads or thermal expansion. This configuration also minimizes the effects of strain due to lateral bending. The resistance sensing bridge of FIG. 4C is governed by $(f)(\Delta 1/1) = \Delta r_g/r_g$, where $f$ is the gauge factor, 1 is the gauge length, and $r_g$ is the gauge resistance, as is well known in the art.

Typically, strain gauges 100 through 106 will be foil-type strain gauges well known in the art. Such strain gauges can easily detect up to 1% resolution. If greater than 1% resolution is desired, semiconductor strain gauges may be used in place of the foil-type strain gauges. Such semiconductor strain gauges possess greater gain factor limits.

In general, strain gauges require amplifiers in operation. The amplifiers have a minimum noise level generated by thermal (including Nyquist) effects in the amplifier components; this noise is amplified along with the input signal, thus limiting the input signal level as a function of the tolerable noise level. The use of a state of the art Michelson-type separation measuring interferometer as shown in FIG. 5, overcomes this electrical noise problem. Thus, replacing the strain gauges with an interferometer-based optical measuring system is a preferable apparatus for implementing the sensor block. The Michelson-type interferometer system uses the interference of light waves to produce alternating bright and dark spots at a detector, which in turn converts the near-ir/visible light it receives to an electrical signal proportional to the light intensity. The peak value of this signal is typically thousands of times greater than the thermal (farir) background noise level, thus eliminating the signal to noise level problems associated with the above-mentioned strain gauge systems.

Basically, the Michelson interferometer system 200 shown in FIG. 5 consists of one or more reflective surfaces, such as mirrors 202 located on a surface of a rotating shaft 204. A measurement unit 206 is located proximate the rotating shaft. Measurement unit 206 includes a light source such as a laser 208, beam splitter 210, mirror 212, polarizing beam splitter 214, and detectors 216a and 216b. The relationship of each of these elements is shown in FIG. 5. Two such arrangements are located on shaft 204 to cancel the effects of axial or radial strain resulting from imposed loads or thermal expansion (by combining distances 1 and 2 or 3 and 4). The strain $R\Delta\theta$ may be calculated as $R\Delta\theta = (\sqrt{2})(\sqrt{d})$. The local twist, $\Delta\theta/\Delta x$, is then determined in terms of the strain measurements at the two elements of the interferometer by equation (13);

$$\Delta\theta/\Delta x = (R\Delta\theta_1 - R\Delta\theta_2)/(2aR) \quad (13)$$

where $R\Delta\theta_1$ and $R\Delta\theta_2$ are the quantities measured by the interferometer at 1 and 2.

A third arrangement of sensors is employed to determine the angular velocity $\theta_t$. Preferably, a state-of-the-art magnetic induction gauge may be utilized, however, other apparatus such as eddy current proximity gauges may be utilized. A state-of-the-art magnetic induction gauge as employed in the preferred embodiment of the present invention is shown in FIGS. 6A and 6B. The device consists of a ring 300 which may be clamped around shaft 302 as shown in FIG. 6A. Ring 300 consists of a small diameter coil of a fine wire 304 with constant loop diameter and spacing wrapped around dielectric potting 306. Each coil loop forms an active element which moves with the surface velocity $R\theta_t$ of the shaft. Three identical magnets 308a, 308b, and 308c are placed around the shaft every 120° to immerse the coil in a magnetic field at these locations. The coil now acts according to Faraday's law as a generator producing a voltage directly proportional to the coil geometry and to the relative motion between the coil and the magnets. The output is directly proportional to the shaft tangential velocity, which is directly proportional to the angular velocity $\theta_t$. The voltage is related to the surface velocity of the shaft by Faraday's law of induction:

$$v = \int (R\theta_t \times B) \cdot dl \quad (14)$$

where dl is the length of the coil element, $R\theta_t$ is the surface velocity of the shaft, and B is the magnetic field intensity. The integration is performed around the element. With the coil element perpendicular to B, as shown in FIG. 6B, the voltage becomes:

$$V = (K)(R\theta_t)(B)(1) \quad (15)$$

where 1 is the length of the loop element, and K is a constant of proportionality. Effects due to shaft lateral motion from flexural vibration are cancelled out exactly by the placement of the magnets every 120°. Accuracy of the system is dependent on maintaining the uniformity of the coil loop spacing and size along the circumference of the shaft, a 1% uniformity giving a 1% $\theta_t$ measurement accuracy. One approach to maintaining a high degree of uniformity is to use printed circuit techniques to make gauge elements or segments with their total length known to a much greater precision than 1%. The output of the coil would be amplified and digitized in a manner similar to that used for the strain gauge system mentioned above.

An alternate method for measuring the angular velocity, $\theta_t$, involves the use of eddy current proximity sensors to measure the location and speed of fiducial marks on, or attached to the shaft, as shown in FIGS. 7A, 7B and 7C. FIG. 7A shows a shaft 400 having a ring 402 with a plurality of fiducial marks 404 circumferentially arranged. A plurality of sensors, three in the present case, 406a, 406b, and 406c (FIGS. 7B, 7C) are located radially outward from ring 402. When three such sensors are used, they are located around the circumference of the ring at 120° intervals. This arrangement allows for the elimination of effects of extraneous motion by an appropriately programmed data processing system. An alternative arrangement will have sensors 406' located adjacent ring 402 as shown in phantom in FIG. 7A.

FIGS. 7B and 7C show two arrangements of fiducial marks 404 and sensors 406a, 406b, and 406c, together with the sensor output related to the particular cross-sectional shape of the fiducial marks. Particular arrangements of sensors and data processing systems will dictate the appropriate cross-sectional shape of fiducial marks 404. Such marks do, however, allow measurement of both displacement, $\theta$, and angular velocity, $\theta_t$. FIGS. 7B and 7C show the output of sensors 406 for the particular cross-sectional shape shown. Slope of the sensor output is directly related to $\theta_t$, while transitions from high to low indicate change in $\theta$ explicitly.

Each of the sensor arrangements discussed above relies on microprocessors for calculation of the various parameters. In a preferred embodiment, the same microprocessor system will be used for measurement of both strain and $\theta_t$. With appropriate selection of a microprocessor, the bandwidth requirements of the combination of the two measurements will still be low compared to that of the microprocessor.

3. Examples

By way of example, assume a simple case of two effective torque densities, $\partial \mathcal{Q}_d/\partial x$ and $\partial \mathcal{Q}_l/\partial x$ acting at the ends of a shaft of circular cross-section and length L, with constant wavespeed v, initial angular velocity $\omega$ representing the cumulative effects of all previously applied torques at the reference time, and constant moment of inertia I(x) per unit length given by equation (16);

$$I(x) = (\pi/2)(R^4 - r^4)\rho \qquad (16)$$

Various features of this example illustrate one or another of the concepts underlying the present invention and highlight its capabilities.

Means for determining the effective torques $\mathcal{Q}_d$ and $\mathcal{Q}_l$ involve two combinations of angular measurements, equations (17) and (18)

$$\theta_a(x,a;t) = [\theta(x+a,t) - \theta(x-a,t)]/(2a) \qquad (17)$$

$$\theta_b(x;t,b) = [\theta(x,t+b) - \theta(x,t-b)]/(2b) \qquad (18)$$

The combinations of $\theta$ at spatial points $x+a$ and $x-a$ at time t of equation (17) provide a measurement of discrete twist $\theta_a(x,a;t)$; the combinations of $\theta$ at times $t+b$ and $t-b$ at a single spatial point x of equation (18) provide a measurement of discrete angular velocity $\theta_b(x;t,b)$. Expression (17) specifies the measurement of $\theta$ alone at two spatial points to replace the direct measurement of the local twist $\Delta\theta/\Delta x$ at a midpoint between those two spatial points. Expression (18) specifies the measurement of $\theta$ alone at two times to replace the direct measurements of $\theta_t$ at a mid time between those two times. In the limit $a \to 0$, $\theta_a$ approaches the differential twist $\theta_x$; in the limit $b \to 0$, $\theta_b$ approaches the differential angular velocity $\theta_t$.

The spatial separation 2a and temporal separation 2b between measurements of the angular displacement are chosen to be causally connected through the relation equation (19).

$$a = bv \qquad (19)$$

For constant linear density of moment of inertia, the effective torques are related to the angular displacement parameters by equations 20 and 21;

$$\mathcal{Q}_d(0,t_L) = (I(X)L/t_L)[\theta_b(X,t) - \omega - V\theta_a(X,t)] \qquad (20)$$

$$\mathcal{Q}_l(L,t_L) = (I(x)L/t_L)[\theta_b(x,t) - \omega + v\theta_a(x,t)] \qquad (21)$$

where $\omega$ is an initial angular velocity which is defined more precisely following equation (25), and where equation (22), $$t_L = 2L/v \qquad (22)$$

is twice the transit time of the wave over the length of the shaft, i.e., the time for the wave to complete a closed cycle over the shaft. Equations (20) and (21) are valid for $\mathcal{Q}_d$ and $\mathcal{Q}_l$ either equal in magnitude (steady state conditions) or different in magnitude (dynamic conditions). They provide means to relate the effective torques and their origins in terms of the values of v and I(x), which can be calibrated, the lengths L and a, which can be measured very precisely when the system is fabricated, and the quantities $\theta_a$ and $\theta_b$, which can be measured quite accurately during normal operation of the power system. The resulting measurement procedures are limited only by the precision of the sensors.

There are two classes of instrumentation systems to realize the determination of torques by the method of this invention. In one class, the time history of $\theta$ is measured in at least two spatial points and at specifically related times to form the discrete twist and angular velocity according to equations (17) and (18). These quantities are then applied in equations (20) and (21) to calculate the effective torques. In this first class of apparatus, a single instrumentation system provides all measurements required to implement the determination of torques. The sensor arrangement shown in FIGS. 3A and 3B provides an example of this class. In the other class, the local twist and either differential or discrete angular velocity are measured directly, generally by distinct instrumentation systems, and these measured values are used in equations (20) and (21) with $\theta_a$ and $\theta_b$ replaced by their local counterparts to calculate the torques. In this class of instrumentation system, two distinct sets of apparatus are generally required, one to measure the local twist and one to measure the local angular velocity. The sensor arrangements shown in FIGS. 4A through 4C and 6A, 6B provide examples of this class. Equations (20) and (21) thus provide the algorithm for relating the torques to combinations of angular displacement parameters measured by both classes of instrumentation systems.

The values of $\mathcal{Q}_d$ and $\mathcal{Q}_l$ are those at retarded times $t_{rd}$ and $t_{rl}$. The retarded times take into account the propagation delays of the torsional wave between the points of the torque's application to the point at which the displacement is measured. They are given by equations (23) and (24):

$$t_{rd} = t_m - s/v \qquad (23)$$

$$t_{rl} = t_m - (L-s)/v \qquad (24)$$

where $t_m$ is some average time of the measurement sequence and s is some mean position of the locations of the sensors.

If the torsion loads vary on a time scale comparable to that of the transit time $t_L$, the torque may be referred to as rapidly varying, and retardation must be taken into account. The case of rapidly varying torques is of practical interest, for example, when an applied load has a torsion component at a frequency equal to one of the natural frequencies of the system; even a small amplitude load can, in that case, lead to stresses in a shaft that increases through resonance to the point of catastrophic failure (i.e., the shaft will snap).

For slowly varying torques, the propagation delays can be neglected, and the retarded times are simply equal to $t_m$. That is, the values of $\mathcal{Q}_d$ and $\mathcal{Q}_l$ are those at the time $t_m$. In this case, the angular velocity varies negligibly over the length of the shaft and the measurement of the angular displacement parameter $\theta_b(x;t,b)$ at the point x can be replaced by its spatial average at the two points $x+a$ and $x-a$ in equation (25).

$$\overline{\theta}_b(x;t,b) = \tfrac{1}{2}[\theta_b(x+a;t,b) + \theta_b(x-a;t,b)] \quad (25)$$

This allows the number of sensors (or sensor pairs) to be reduced from three (at $x-a$, $x$, and $x+a$) to two (at $x-a$ and $x+a$).

The physical significance of the terms in expressions (20) and (21) clarifies the relationships between the measured quantities and the effective torques. The value of the angular velocity $\omega$ is a measure of the cumulative effect of torques acting prior to the onset of the current sequence of angular measurements. The values of the torques at the time $\omega$ was last measured are determined and stored. The time interval between the last measurement of $\omega$ and the onset of the current measurement of $\theta_b$ will be referred to hereinafter as the sampling time. Normally, the sampling time will be chosen to reflect the anticipated time scale of variations of the torques being monitored. Changes in the value of either torque can be determined by repeated sampling (that is, repeating the sets of measurements called for by the algorithm) on the shorter of the time scales over which the two torques change and comparing the new values with the previous ones. The combination $(\theta_b - \omega)$, which represents an inertial effect that vanishes when the torques are not changing, manifests the change in the shaft's angular velocity produced by a change in effective torques. If the system has not yet accelerated within the last sampling period, this combination is zero and the two torques are equal in magnitude and opposite in sign. In this case, the expressions for their magnitudes reduce to the steady state relation of equation (1). The term $\theta_a$ represents the discrete twist produced by the applied torques, whether steady state or dynamic.

Directional filters that decouple the contributions of the individual torsion components at the causally connected space-time points related by equation (19) are given by equation (26);

$$F_\pm(x,a;t,b) = \theta_b(x;t,b) \pm v\theta_a(x,a;t) \quad (26)$$

That is, $F_+$ of equation (26) measures signals propagating in one direction only, and $F_-$ of equation (26) measures signals propagating in the other direction only. The measurement of specific combinations of angular displacement parameters at causally connected space-time points is seen to 1) decouple the effects of the effective torques, and
2) determine the absolute value of each effective torque component in terms of calibrated and measured quantities for steady state as well as for dynamic conditions.

For example, suppose that one of two torques changes while the other remains unchanged between successive measurements. By comparing the results of two sets of measurements, the torque that changes can be identified and the value by which it changes can be determined. The method of conventional strain gauges, however, cannot determine the source of the change but simply a weighted average of whatever changes the system undergoes (i.e., if the change in torque of one source is 2%, the weighted average which conventional strain gauge measurements will show is a change of approximately 1% in the net torque on the system). In the limits in which $\theta_b$ and $\theta_a$ approach the differential angular velocity $\theta_t$ and differential twist $\theta_x$, respectively, the directional filters $F_\pm$ approach the total directional time derivatives, equations (27) and (28);

$$\frac{\overrightarrow{d\theta}}{dt} = \theta_t + v\theta_x, \quad (27)$$

$$\frac{\overleftarrow{d\theta}}{dt} = \theta_t - v\theta_x. \quad (28)$$

The causal transmission of the response to the torque is made up of torsional waves moving in both directions over the shaft with speed v. Equation (27) gives the change in the angle $\theta$ due to the torsional wave moving in one direction and equation (28) gives the change in $\theta$ due to the wave moving in the opposite direction. Equations (26) for the directional filters provide the practical realizations of this separation, which underlies in large part the physical basis for this invention. The combinations of angular measurements specified by equations (20) and (21) thereby separate the effects of torsional waves moving in opposite directions. The effective torques $\mathcal{G}_d$ and $\mathcal{G}_l$ determined by these measurements are the sources of torsional waves acting on the shaft on opposite sides of the measuring apparatus; that is, each of these torques includes contributions from all reflections of torsional waves at the shaft boundary (junction) on one or the other side of the measuring apparatus. Hence, each of the effective torques $\mathcal{G}_d$ and $\mathcal{G}_l$ in general still contains contributions from selected portions of the time histories of the applied torques $T_d$ and $T_l$ acting on both sides of this apparatus. The effective torques are of primary interest for some applications, such as the detection of cracks at junctions in an assembly of coupled shafts. But for many other applications, such as control functions, the quantities of primary interest are the applied torques at recent times. The applied torques at recent times are determined by separating from each other the contributions of the applied torques to the effective torques and separating the past histories of the applied torques from their present values. This is accomplished by taking further account of the causal propagation of the torsional waves over the shaft, their reflections at the junctions, and the specific manner in which their present and past values combine to form the effective torques, according to equation (29) and (30);

$$T_d(t) = \mathcal{G}_d(x, t+(x/v)) - r_d \mathcal{G}_l(x, t-(x/v)) \quad (29)$$

$$T_l(t) = \mathcal{G}_l(x, t+(L-x)/v) - r_l \mathcal{G}_d(x, t-(L-x)/v) \quad (30)$$

where $r_d$ is the reflection coefficient at the end of the shaft where $T_d$ is applied, and $r_l$ is the reflection coefficient at the end where $T_l$ is applied. The relations (29) and (30) take into account the time delay for a component of the torsional wave generated at one end of the shaft to reflect at the other end and arrive at the measuring apparatus. These equations actually serve a dual function: Effective torques determined for known speed of torsional waves can be used (i) to determine applied torques for known reflection coefficients, and (ii) to calibrate the reflection coefficients for a known applied torque, $T_d$ or $T_l$. In the latter case, expressions (31) and (32) below provide means for calibrating $r_d$ and $r_l$ in terms of effective torques determined by the method of this invention and a known applied torque;

$$r_d = [\varphi_d(x, t+(x/v)) - T_d(t)] / [\varphi_l(x, t-(x/v))] \quad (31)$$

$$r_l = [\varphi_l(x, t+(L-x)/v) - T_l(t)] / [\varphi_d(x, t-(L-x)/v)] \quad (32)$$

Equations (31) and (32) remain valid when one of the applied torques, $T_d$ or $T_l$, is zero.

Calibration of $r_d$ and $r_l$ in terms of total known torques is of practical significance on a test bed. Under operating conditions, however, the total applied torques remain in general unknown to the extent that the reflection coefficients need recalibration. These coefficients can nonetheless be calibrated under operating conditions by impressing a known torque of transitory duration. The basic requirement on the characteristics of this known torque is that it be readily identifiable over the unknown torques without interfering unacceptably with the normal operation of the system. These criteria are satisfied by a torque whose magnitude (in space-time) is negligible compared to the unknown torques to be determined and a frequency spectral content peaked at a frequency, $\omega_i$, at which the frequency spectrum of the unknown torques has a negligibly small amplitude. The duration of the known impressed torque needs to be at least several times the reciprocal of $\omega_i$ in order to give a readily identifiable peak in its spectrum. The time histories of the effective torques are then taken over the duration of the impressed known torque and passed through a frequency-spectrum analyzer. The procedure for measuring the values of a physical quantity over a period of time and passing the data through a spectrum analyzer is well known to those of ordinary skill in the art. The reflection coefficients are then expressed by equations (29) through (32) in terms of the measured frequency transforms of the effective torques evaluated at $\omega_i$ and the known frequency transform of the impressed torque.

Any or all of the values of the determined torque components can then be made available for further use, such as control functions.

Measurements of other angular displacement parameters can readily be combined specifically to yield additional information. For example, changes in individual torque components can be determined directly by specific combinations of measurements of local twist $\Delta\theta/\Delta x$ and of discrete angular velocity at specifically related space-time points, provided the variation of $\Delta\theta/\Delta x$ over the size h of the measuring device is smaller than the acceptable error in the difference between the values of $\Delta\theta/\Delta x$ measured by two different devices at said respective space-time points. If the variation of $\Delta\theta/\Delta x$ over h is not negligible compared to said difference, changes in the values of individual torque components can still be determined directly, but in general such determinations involve measurement of differences of twist.

By way of a final example, the following describes the application of this invention to the detection of the onset of fractures in an assembly of coupled shafts. The shafts are taken to be of equal length, but unequal shaft lengths is within the scope of this invention. In such an assembly, each joint between shafts acts as a source and sink of torsional waves. Hence the system comprises multiple torque loads. The method of this invention to determine the temporal and spatial origin of a failure in such an assembly comprises multiple sets of causally selected measurements made by multiple sets of sensors, one set between each consecutive pairs of joints. Each set of sensors identifies and localizes one or more sources of effective torsional loads.

There are two aspects to the problem of detecting the onset of fracture in an assembly of coupled shafts:

1) Separate identification and localization in time of each of multiple sources of waves acting at known points along a shaft assembly; and
2) Detection of onset and location of an unknown source of waves against a background from known sources.

A separate set of single shaft measurements is first carried out for each segment of the assembly on which effective torques are to be determined, by the method of this invention. FIG. 8 shows such a coupled shaft arrangement. The signal at joint n at the position $x = nL_-$ is determined by analysis of the segment $(n-1)L \leq x \leq nL$, and the signal at the same joint at $x = nL_+$ is determined by analysis of the contiguous segment $nL \leq x \leq (n+1)L$. The difference between the signal going in at one side of the joint $x = nL_-$ and the signal coming out at the other side of the joint $x = nL_+$ gives the absorption at joint n; in general, the two sides of a joint function as different sources because of possible absorption at the joint.

The time integrated correlations $C_{n\pm, m\pm}$ of the disturbances are then computed electronically by suitably designed correlators, and are given by equations (33) and (34):

$$C_{n\pm, m\pm}(t) = (1/t_0) \int_0^{t_0} s_{n\pm}(t') s_{m\pm}(t + t') dt' \quad (33)$$

$$s_{n\pm} = s(nL_\pm, t) \quad (34)$$

where the time $t_o$ over which the correlations are integrated satisfies equation (35);

$$|n - m| L/v < t_o < t_{bp} \quad (35)$$

where $t_{bp}$ is the time scale over which fracture develops to the breaking point. A change in the correlation function $C_{n\pm, m\pm}$ is indicative of a change in the properties of the shaft assembly between joint n and joint m, such as wear or the development of a fracture. A malfunction due to a change in the material and/or elastic properties of the shaft assembly will then be detected by monitoring these correlation functions. In particular, for $m = n + 1$ the developing malfunction is further localized along the particular segment of the shaft assembly between joint n and joint n+1. The design and use of correlators is well known to those of ordinary skill in the art.

In some applications, e.g., in drilling assemblies, most fractures develop at or near the base of the joint. For such applications, the self-correlations, $C_{n\pm, n\pm}$, may be particularly useful.

Typical forms of those correlations are shown in FIGS. 9A and 9B below. The times $t_n$ are multiples of the transit time of the wave between joints given by equation (36);

$$t_n = nL/v \quad (36)$$

The peaks in the correlations are due to the fact that the shape of the pulse (wave) varies over time, so that correlations of a given portion of the signal are reinforced. The time intervals between peaks correspond to the time delay for a signal from a given joint to travel to a different joint, reflect and return to the original source. The time records of these correlations are then stored electronically. That is: (1) successive values of $C_{n,m}$ are stored and averaged; (2) each new measurement of $C_{n,m}$ is subtracted from the average; and (3) the difference between the average and the most recent value is accumulated as an indicator of the onset of failure. The changes in the accumulated differences between current values and the average values of the correlations due to structural changes in the materials of the shaft assembly are of different types, depending on the physical nature of the structural changes and on the location of these changes.

Prior to the onset of an actual fracture in the shaft assembly, the material undergoes a change in its microscopic structure. This is accompanied by a change in the speed of waves propagating through the structure. Such a structural change will therefore produce a change in the time intervals between successive peaks and the correlations that involve propagation of the wave through the domain of the changing structure.

A fracture occurring between a given joint and the sensors on the shaft coupled through that joint will appear as a new source of torsional waves. The reflections produced by the fracture will cause new peaks, specific to the location of the fracture, to appear in the correlation functions.

A fracture occurring at a given joint will appear as an increase in the absorption of the signal through that joint. Hence the peaks in the correlations between the signals from opposite sides of that joint will decrease in intensity.

Although the present invention is applicable to a variety of power systems transmitting torque through a rotating shaft, although the description of these systems may require a variety of initial and boundary conditions, and although the choices of angular measurements for these systems may vary, the invention has been described in light of a number of specific examples. In general, to those skilled in the art to which this invention relates, many changes in construction and widely differing embodiments and applications of the present invention will suggest themselves without parting from its spirit and scope.

For example, the above-described methods and equations can be used to determine parameters of shafts subjected to torques given various known and applied conditions related thereto. Specifically, the present invention is applicable to the determination of:
(1) effective torsional loads;
(2) applied torsional loads;
(3) onset of shaft failure, including cracks and other structural irregularities;
(4) reflection coefficients;
(5) torsional wave speed; and
(6) operating temperature.

Thus, the disclosures and descriptions herein are purely illustrative, and are not intended to be in any sense limiting.

We claim:

1. A method for determining the magnitudes and spatial and temporal origins of independent effective dynamic torsion loads acting in superposition upon a rotating shaft with known inertial and geometric characteristics and known torsional wave speed, a torsion load producing a torsional wave in said rotating shaft, comprising the steps of:

determining the inertial response of said shaft to said superposed torsion loads;

determining discrete relative angular displacement parameters of said shaft at predetermined space-time points on said shaft, said space-time points being causally connected through the transmission of a torsional wave from one said point to another; and calculating the magnitudes and origins of the individual dynamic torsion loads from the inertial response and the discrete relative angular displacement parameters.

2. The method of claim 1, wherein magnitudes and origins are calculated from the inertial response and a plurality of dynamically independent angular displacement parameters.

3. The method of claim 2, wherein said dynamically independent angular displacement parameters are twist and angular velocity.

4. A method for determining the magnitudes and spatial and temporal origins of a plurality of individual effective dynamic torsion loads acting in superposition upon a rotating shaft with known inertial and geometric characteristics and known torsional wave speed, comprising the steps of:

determining spatial and temporal characteristics of torsional waves produced by the net action of the plurality of individual dynamic torsion loads by measurement of relative angular displacement parameters at causally-connected space-time points, said measurements representing the collective effects of the torsion loads;

combining specifically said determined spatial and temporal characteristics of torsional waves such that the effects of individual effective torsion loads may be distinguished from one another; and determining from said combination the magnitude and origin of each individual effective torsion load.

5. A method for determining the magnitudes and origins of individual applied torsion loads acting in superposition upon a system including a shaft having first and second ends, said shaft having known inertial and geometric characteristics, known torsional wave speed, and known reflection coefficients for torsional waves at each said first and second ends, comprising the steps of:

determining the magnitudes and origins of the effective torsion loads acting at a specific point along the shaft at specifically related times;

combining the effective torsion loads generated at said first end at a first time with the effective torsion loads generated at said second end at a second time delayed by a predetermined amount from said first time, such that the time required for a component of a torsional wave generated at said first end to travel the length of the shaft, reflect at said second end and return to said specific point is accounted for, and further such that any effects of reflection of the torsional wave at either said first end or said second end are considered in said combination; and determining from said combination of effective torsion loads the magnitude and origin of each individual applied torsion load at a time which is the mean time of said specifically related times.

6. The method of claim 5, wherein the step of determining the magnitudes and origins of the effective torsion loads comprises the steps of:

determining the inertial response of said shaft to said superposed effective torsion loads;

determining discrete angular displacement parameters of said shaft at predetermined causally connected space-time points; and calculating the magnitudes and origins of the individual effective torsion loads from the inertial response and the discrete angular displacement parameters.

7. The method of claim 6, wherein magnitudes and origins are calculated from the inertial response and a plurality of dynamically independent angular displacement parameters.

8. The method of claim 7, wherein said dynamically independent angular displacement parameters are twist and angular velocity.

* * * * *